May 20, 1941.    T. C. NEWTON    2,242,369
GRASS CUTTER
Filed April 18, 1939    2 Sheets-Sheet 1

Inventor,
Thomas C. Newton

May 20, 1941.  T. C. NEWTON  2,242,369
GRASS CUTTER
Filed April 18, 1939   2 Sheets-Sheet 2

Inventor.
Thomas C. Newton

Patented May 20, 1941

2,242,369

UNITED STATES PATENT OFFICE 2,242,369

GRASS CUTTER

Thomas C. Newton, Brookline, Mass.

Application April 18, 1939, Serial No. 268,537

10 Claims. (Cl. 56—246)

This invention relates to grass cutters particularly adapted, although not necessarily limited, to the cutting of tall grass found particularly on the edges and borders of lawns in places not accessible to the ordinary type of revolving blade lawn mower.

The grass cutter of the present invention includes a reciprocating or oscillating cutter element or blade driven by a cam wheel, which wheel preferably is also the ground engaging wheel of the cutter, the wheel being so shaped that each revolution thereof causes several strokes of the movable cutter element to be made.

Grass cutters of the type above set forth have been proposed heretofore. In such prior grass cutters, however, the reciprocation of the movable cutter element by the cam wheel has been effected usually through a lever. It has been found, however, that such grass cutters run hard, or take considerable power to push, because of the binding action between the lever and the cam wheel due to the arcuate path of movement of the cam engaging part of the lever and also due to the pressure exerted on the lever at right angles to its plane of oscillation by the abruptly inclined cam faces of the wheel. As a result of the large amount of friction present in such a device, it is believed that the device has only been used commercially when operated by some form of power plant.

The pressure exerted between the cam and the lever at right angles to the plane of oscillation of the lever also tends to separate the coacting cutter elements so that the cutting action is impaired unless the mechanism is designed to prevent this result. Such design usually complicates the device and renders it more expensive to construct and difficult to keep in operation.

An object of the present invention is to provide a grass cutter employing a reciprocating or oscillating cutter element driven by a cam wheel, which preferably also is the ground engaging wheel, with mechanism interconnecting the movable cutter element and the cam wheel so arranged that there is no undue binding or friction between the parts to the end that the device can be operated easily manually.

A further object of the invention is the provision of a grass cutter of the type above set forth wherein a reciprocating sliding member is interposed between the movable cutting element and the cam wheel, the slide moving crosswise of the cam wheel in a line parallel with the axis of the wheel and having an operative connection with the movable cutter element.

Another object of the invention is the provision of a grass cutter of the type set forth wherein that component of the pressure of the cam that acts transversely of the direction of movement of the slide either is without tendency to separate the cooperating cutter elements or tends to hold the cooperating cutter elements in engagement.

A further object of the invention is the provision of a grass cutter of the type set forth having novel means to reduce the friction between relatively moving and stationary parts thereof.

A yet further object is generally to improve the construction and operation of grass cutters.

Figure 1:
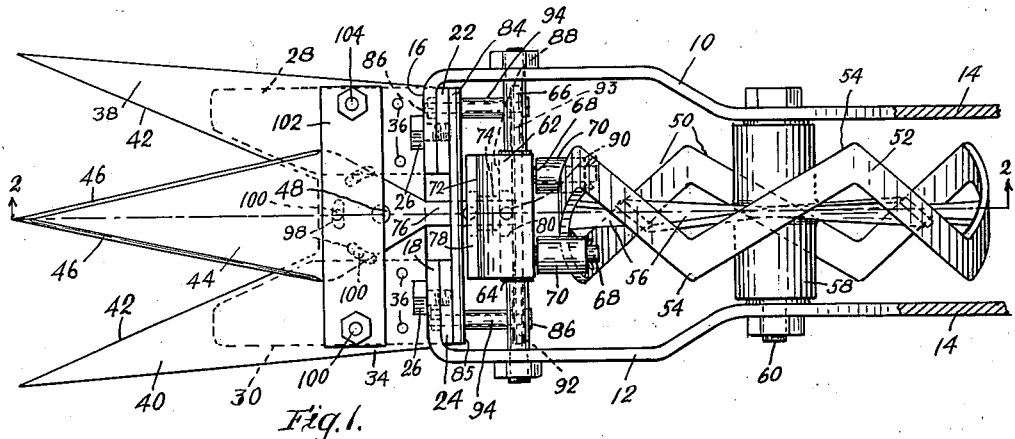
Fig. 1 is a plan view of a grass cutter embodying the present invention.

The grass cutter illustrated in Figs. 1 through 4, includes a pair of horizontally spaced side bars 10 and 12 having horizontal foreparts and upwardly inclined rear parts 14 adapted for attachment to a convenient handle, not illustrated. The horizontal foreparts have inwardly directed confronting and spaced end parts or ears 16 and 18. A pair of shoe plates 20 are located below and forwardly of the bars and have upwardly directed horizontally spaced legs 22 and 24 abutted against the inner side faces of the ears 16 and 18 and secured removably thereto by bolts 26. The shoe plates are provided with horizontal forwardly directed cutter-supporting sections 28, 30 the front end parts of which are curled downwardly to provide ground engaging shoes or runners 32.

A stationary cutter element in the form of a thin steel plate 34 is fixed to and bridging the sections 28, 30 of the shoe plates 20 by suitable means as rivets 36 and is provided with a pair of forwardly projecting blades 38 and 40 having inclined confronting cutting edges 42 that form between them an approximate V-slot into which the grass collects as the device is advanced.

A movable cutter element or blade 44 cooperates with the stationary cutter element. The blade 44 is spear shaped in configuration and is provided with opposed cutting edges 46 converging towards the front end of the blade and cooperating with the blades 38 and 40. The movable blade rests upon and overlies the stationary blade and is pivotally connected therewith by suitable means as a rivet 48 passing through both blades in the rear parts thereof.

The movable blade is adapted to be oscillated or swung from side to side and pass over the stationary blades 38 and 40 to shear off the grass collected between the blades. Such movement is provided by mechanism including a cam wheel 50 which is also the ground engaging wheel that supports the device as it is moved over the surface of the ground. Said cam wheel 50 has a ground engaging circular rim 52 shaped to provide a plurality of oppositely inclined portions 54, the side faces of which form cam faces that effect the oscillation of the movable cutter element. The cam faces are arranged to effect a number, herein four, of oscillations of the movable cutting element for a complete rotation of the wheel. The rim 52 is connected by spokes 56 to a hub 58 which is journalled on a shaft or bolt 60 passed through and secured to the side bars 10 and 12, the wheel being between the side bars.

The mechanism for operatively connecting the wheel and the movable cutter element includes a slide member 62 located between the wheel and the movable cutter element and also between the side bars 10 and 12. Said slide member is provided with a tubular part 64 which is freely slidable on a rod or bolt 66 extended through and carried by the side bars in front of the wheel. The slide member 62 is provided with a pair of rearwardly extended projections 68 which overlie the side faces of the cam wheel and are provided with rollers 70 which are adapted to engage the side edges of the wavy rim of the wheel. Thus as the wheel is rotated the slide member is caused to be reciprocated. The slide member is provided with a relatively broad faced vertically depending part 72 which has a slot 74 in its lower end portion into which a rearward projection or tongue 76 of the movable cutter element 44 is extended loosely. Thus as the slide member is reciprocated the cutter element is correspondingly oscillated through the projection 76. This arrangement is simple and efficient and relieves the movable cutter element from any pressure exerted thereon at right angles to the plane of oscillation caused by the cam wheel. The slide member is conveniently made of a stamping having the right-angularly related vertical and horizontal sections 72 and 68 with the tubular part 64 in the form of a tube welded to the stamping in the bend thereof.

Figure 2:
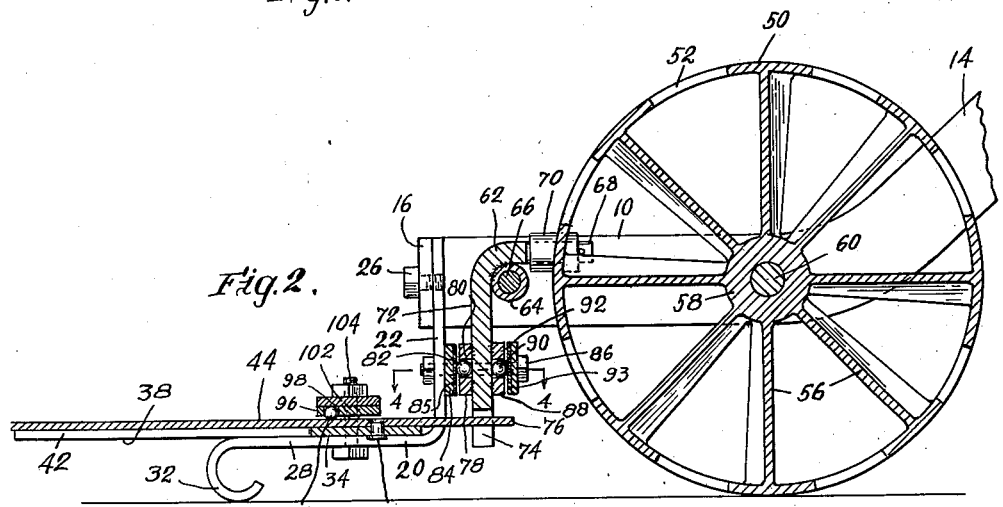
Fig. 2 is a sectional elevation taken along line 2—2 of Fig. 1.

The action of the cam wheel on the slide member exerts a vertical force thereon in a direction tending to cause the slide member to rotate about the rod 66 in a clockwise direction, Fig. 2. This component of force is resisted by an anti-friction device including a ball retainer plate 78 fixed horizontally to the forward face of the vertical part 72 of the slide member in any suitable manner and having a horizontally elongated slot 80 therein, see Figs. 3 and 4, in which an anti-friction ball 82 is movably located. The ball is somewhat greater in diameter than the thickness of the retainer plate 78 so that a portion of its periphery projects outwardly of the forward face of the retaining plate. The ball cooperates with a race or bearing plate 84 fixed to and extended across the upstanding legs 22 of the shoe plate by bolts 86 and with the opposed parallel face of the vertical bearing part or plate 78 of the slide member. Thus as the slide member is reciprocated the thrust thereon is taken by the anti-friction ball 82 so that the reciprocation of the slide member takes place with little friction. A similar ball retaining plate 88 is secured to the rear face of the depending portion 72 of the slide member and has a ball 90 therein which cooperates with a race plate 92 which receives the thrust of the cam wheel on the slide member in rearward movements of the device. The plate 92 is clamped in suitably spaced relation with respect to the slide member between the aforesaid bolts 86 and spacer sleeves 94 on said bolts Preferably thin rear plates 85 and 93 are interposed between the plates 84 and 92 and the balls and are directly engaged by the balls. Said rear plates are hard and resist wear while the plates 84, 92 can be of softer and cheaper metal.

The movable cutter element 44 is provided with an anti-friction support similar to that of the sliding member. Said support comprises a spacer plate 96 extended over and crosswise of the movable cutter element in front of the pivot 48 therefor and is provided with three arcuate slots 98 spaced concentrically with the pivot and in which slots anti-friction balls 100 are located. The balls bear upon the lower face of an overlying race plate 102 which is supported in suitably spaced relation with the stationary cutter plate by bolts 104 which pass through all the aforesaid plates. The bolts can be tightened if needed to take up for wear between the cutter elements so as to keep the movable cutter element down against the stationary cutter element.

In the modification illustrated in Figs. 5 through 8, the invention is applied to a grass cutter having a plurality of cutting elements. In this form of the invention the horizontally spaced side bars 110, 112 are provided with outwardly turned ears 114, 116 to which is secured by bolts 118 the ends of vertical brackets 120 having horizontally directed ears 122 at the bottom parts thereof which are secured by screws 126 to the under face of a horizontal stationary cutter or comb plate 124. Said cutter plate 124 is provided with a plurality of horizontally spaced cutter projections or comb teeth 128 having horizontal slots 130 therein in which the movable triangular blades 132 of the movable cutter element are operable. Said blades 132 are fixed to a bar 134 which is loosely located in and reciprocable lengthwise of a slot 136 formed in the upper face and extended lengthwise of the cutter plate. Leaf springs 138 are clamped to the cutter plate under the aforesaid screws 136 and overlie and bear yieldingly upon the top face of the movable blade structure to hold the blades onto the bottoms of the aforesaid slots 130, the side edges of which cooperate with the inclined edges of the cutter blades 132 to shear off the grass between the projections or comb teeth 128.

Figure 5:
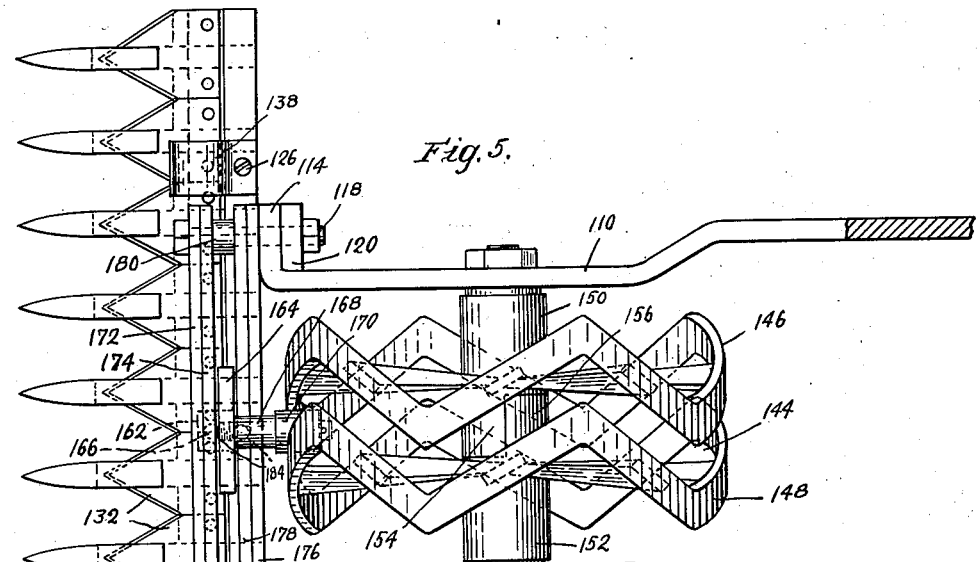
Fig. 5 is a plan view of a modified form of grass cutter embodying the present invention.
Figure 6:
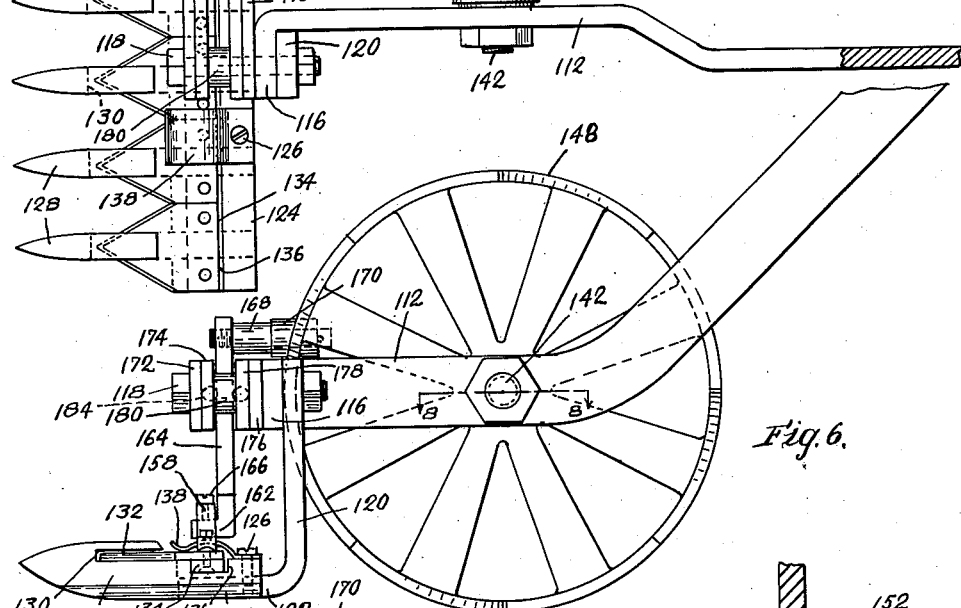
Fig. 6 is a side elevation of the grass cutter of Fig. 5.

The cutter blades are reciprocated by means including a cam wheel located between the bars 110, 112 and journalled on a shaft 142 carried by said bars. The cam wheel is, as in the first modification, also the ground engaging wheel. The cam wheel is composed of two identical rim sections 146 and 148 spaced apart horizontally apart to provide a cam groove 144 between them. The rims are provided with similar inclined sections which form a cam groove oppositely inclined in successive parts thereof by which the movable cutter element is reciprocated repeatedly during a complete rotation of the cam wheel. The rims 146, 148 have separate hubs 150, 152 provided with projecting half hubs or parts 154, 156 which interlock or bear against each other, as illustrated in Fig. 5, so that the wheel rims are spaced from each other to provide the cam slot 144 and also so that the two wheel sections rotate together. The rims of the sections are or can be identical with the rim of the wheel of the modification illustrated in Fig. 1.

In this second modification the reciprocating slide member that connects the movable cutter element with the cam wheel includes the reciprocating cutter bar 134. The cutter bar is provided with a yoke 158 which is riveted to the middle part of the bar 134 and upstands thereabove. The yoke is provided with a longitudinally elongated slot 160 into which the forwardly extended horizontal ear 162 of a vertical plate 164 is fixed removably by a clamping screw 166. The upper end of the plate has rigidly fixed thereto a rearwardly extended pin or stud 168 which carries a roller 170 located in the cam groove 144 and engageable with the confronting sides of both rim sections. Thus as the cam wheel is rotated the cutter bar and its associated cutter element are caused to be reciprocated.

Figures 3, 4:
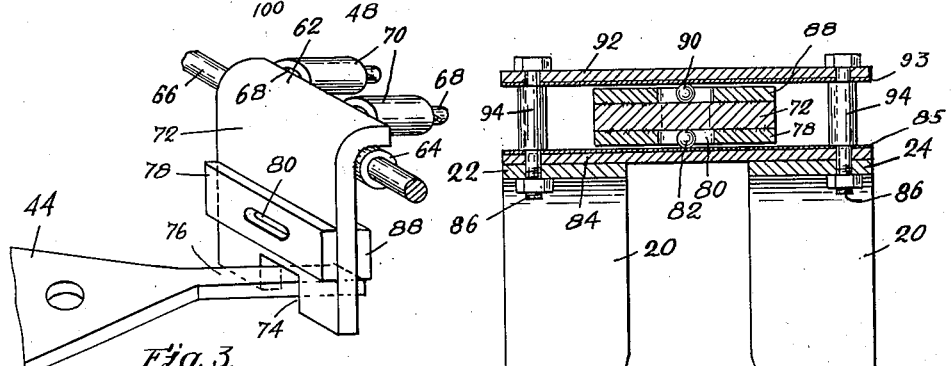
Fig. 3 is a perspective view of the slide member connecting the oscillating cutter blade and the cam wheel.
Fig. 4 is a section taken along line 4—4 of Fig. 2.
Figure 7:
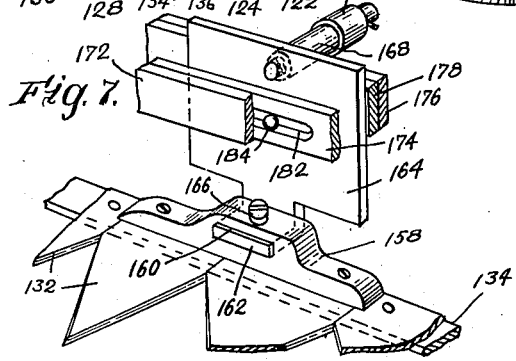
Fig. 7 is a perspective detail of the mechanism connecting the movable cutter blades with the cam wheel.
Figure 8:
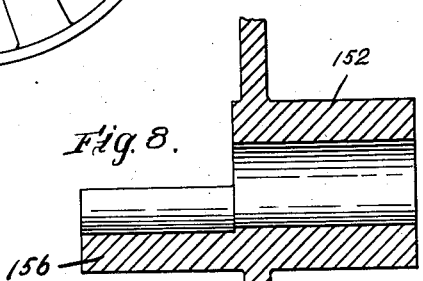
Fig. 8 is a section taken along line 8—8 of Fig. 7 and illustrating the interlocking hub formation of the two parts of the cam wheel.

The plate 164 is guided for reciprocatory movement by anti-friction means similar to that illustrated in Figs. 2 and 4. Said anti-friction means includes a race plate 172 and a cooperating ball retainer plate 174, located horizontally in front of the plate 164 and a second race plate 176 and a cooperating ball retainer plate 178 located in the rear of the plate 164 and overlying the ears 114, 116 of the side members 110, 112. Said pairs of plates are secured to the side members by the aforesaid bolts 118 and held in spaced relation by spacer washers 180 on said bolts. The retainer plates 174, 178 are provided with longitudinally directed slots 182, one of which is illustrated in Fig. 7, and each slot has a ball 184 therein which engages the reciprocatory plate 116 and an associated race plate so that the plate 164 can be reciprocated freely without cramping or binding.

The rims of the ground-engaging cam wheels of both Figs. 1 and 5 are relatively narrow and the cam sections are inclined to the direction of motion of the device so that they act to grip the ground firmly and prevent slipping as the device is pushed along. The effective axial width of the rim of the wheel, from the junction of a pair of oppositely inclined rim sections on one side of the wheel to a similar junction on the other side of the wheel is sufficiently great, however, to support the wheel upright.

I claim:

1. In a grass cutter, a movable cutter element, a ground engaging cam wheel in the rear of said cutter element, a reciprocatory slide member interposed between said cutter element and wheel, a support for said slide member disposed in front of and parallel with the axis of said wheel and on which support said slide member is reciprocable in a straight line, operative connections between said slide member and said cutter and wheel by which said slide member is reciprocated upon rotation of said wheel to effect the operation of said cutter element, and means engageable with said slide member between said support and one of said connections for holding said slide member against turning movement on said support.

2. In a grass cutter, a movable cutter element, a ground engaging cam wheel located rearwardly of said cutter element, a slide member between said wheel and said cutter element reciprocable in a straight line crosswise of the face of said wheel, a guide on which said slide member is slidable, operative connections between said slide member and said cutter element and said wheel by which rotation of said wheel effects the reciprocation of said slide member and the operation of said cutter element, and an anti-friction slide bearing engaging said slide member between said support and one of said connections for preventing rotation of said slide member on said guide, said bearing including a ball bearing on and adapted to roll in engagement with a face of said slide member, a retainer plate having a ball retaining slot extended in the direction of reciprocation of said slide member, and a race plate overlying said retaining plate on the side opposite said slide member and adapted to be engaged by said ball.

3. In a grass cutter, a movable cutter element, a driven cam wheel, a reciprocatory slide member, a support on which said member is reciprocable in a straight line, said slide member having an operative connection with said cutter element on one side of said support, and a roller engageable with said cam wheel on the other side of said support, and means providing an anti-friction slide bearing engageable with said slide member on one side of said support and on which bearing said slide member is reciprocable and disposed to resist movement of said slide member crosswise of its line of reciprocation.

4. In a grass cutter, a frame including a pair of horizontally spaced bars, a stationary cutter element disposed below said bars and having upstanding ears fixed to said bars, a ground engaging cam wheel located between and journalled on said bars, a movable cutter element on said stationary cutter element, an upstanding slide member located above said cutter element and in front of the periphery of said wheel having an operative connection at its lower end part with said movable cutter element and having at its upper end and in the rear thereof a roller engageable with said cam wheel for reciprocating said member, and anti-friction slide bearings between and in engagement with which said upstanding member is reciprocable, said bearings constituting a reciprocating support for said vertical member admitting reciprocation thereof in a straight line.

5. In a grass cutter, a frame including a pair of horizontally spaced slide bars, a stationary cutter element fixed to said bars, an oscillatory cutter element disposed on and having a pivotal connection with said stationary cutter element, a ground engaging cam wheel located between and journalled on said bars, a guide rod carried by said bars in front of said wheel and above said cutter elements, a slide member reciprocable on said rod having a roller engageable with said cam wheel, said slide member having an operative connection with said oscillatory cutter element for oscillating it, and means engageable with said slide member for holding it against rotation on said rod.

6. In a grass cutter, a frame including a pair of horizontally spaced side bars, a stationary cutter element located below and carried by and extended forwardly of said side bars, an oscillatory cutter element on said stationary cutter element and having a pivotal connection therewith and having a tongue extended rearwardly of said pivotal connection, a ground engaging cam wheel located between and journalled on said side bars, a guide rod carried by said side bars forwardly and cross-wise of said wheel and above said cutter elements, a slide member reciprocable on said guide rod having a roller engageable with the cam face of said wheel and having a depending part provided with a slot in which said tongue is located loosely, and anti-friction slide bearings disposed on opposite sides of and engageable with said depending part of said slide member and carried by said side bars operative to hold said slide member against rotation on said guide rod.

7. In a grass cutter, a stationary shear plate, an oscillatory shear element adapted to oscillate over said shear plate, and means for holding said element and plate in contact including an anti-friction rotary bearing having a retainer plate overlying said shear element and provided with an arcuate slot concentric with the center of oscillation of said shear element, a ball loose on said slot, and a race plate overlying said retainer plate and the slot and ball therein and having a bearing on said ball.

8. In a grass cutter, a frame, a ground-engaging cam wheel journalled in said frame, cooperating stationary and movable cutter elements carried by said frame forwardly of said wheel, and mechanism operatively connecting said wheel and movable cutter element including a slide member carried by said frame forwardly of said wheel and above said cutter elements, said slide member including a stamping having reflexed vertical and horizontal parts, said horizontal part having spaced rollers engageable with said cam wheel and said vertical part having a tongue and slot connection with said movable cutter element, a tube fixed to said stamping in the bend between said vertical and horizontal parts, and a rod carried by said frame passed loosely through said tube in front of said wheel and on which tube said slide member is reciprocable.

9. In a grass cutter, a movable cutter element, a ground-engaging cam wheel in the rear of said cutter element, a vertical operating member reciprocable parallel with the axis of said wheel located in front of said wheel and above said cutter element having at its lower part an operative connection with said cutter element for moving it back and forth and having at its upper part cam follower means extended rearwardly and disposed in cooperative relation with said cam wheel to be reciprocated thereby, and fixed bearing means engageable with said member between the upper and lower parts thereof and in which said member is reciprocable, disposed and arranged to support said member against movement crosswise to its line of reciprocatory movement.

10. In a grass cutter of the type having a horizontal stationary cutter and a horizontal movable cutter that moves back and forth with respect to the stationary cutter and a supporting frame in the forepart of which said cutters are located, the combination therewith of operating mechanism for the movable cutter comprising a member having a support on said frame for horizontal reciprocatory movement to move the movable cutter back and forth and having a cam follower by which it is reciprocated, and means for reciprocating said member consisting of a ground-engaging cam wheel journalled in said frame rearwardly of said cutters and having a hub, a horizontal shaft carried by said frame on which said hub is rotatable, spokes radiating from said hub, and a periphery that is of uniform axial extent throughout and consists of a plurality of contiguous sections that are oppositely inclined to each other in zig-zag fashion forming cam members engageable with said follower for reciprocating said member, the overall axial dimension of said periphery between the junction of two oppositely inclined sections on one side to the junction of two oppositely inclined sections on the other side of said wheel providing stable upright support for said wheel and the width of any section being narrow and being inclined with respect to the line of movement of the device to grip the ground and prevent slipping in engagement therewith.

THOMAS C. NEWTON.